(12) United States Patent
Kalisch et al.

(10) Patent No.: US 10,402,291 B2
(45) Date of Patent: Sep. 3, 2019

(54) CHECKING DEVICE FOR DATA PREPARATION UNIT

(71) Applicant: Robert Bosch GmbH, Stuttgart (DE)

(72) Inventors: Matthias Kalisch, Reutlingen (DE); Ali Abbas Husaini, Stuttgart (DE); Christian Pfahler, Tübingen (DE)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 15/523,148

(22) PCT Filed: Sep. 18, 2015

(86) PCT No.: PCT/EP2015/071429
§ 371 (c)(1),
(2) Date: Apr. 28, 2017

(87) PCT Pub. No.: WO2016/071034
PCT Pub. Date: May 12, 2016

(65) Prior Publication Data
US 2017/0337111 A1    Nov. 23, 2017

(30) Foreign Application Priority Data

Nov. 4, 2014   (DE) .................. 10 2014 222 479

(51) Int. Cl.
*G06F 11/00* (2006.01)
*G06F 11/27* (2006.01)
(Continued)

(52) U.S. Cl.
CPC .............. *G06F 11/27* (2013.01); *B60R 21/01* (2013.01); *G06F 11/24* (2013.01); *G08C 25/00* (2013.01); *H04Q 9/00* (2013.01); *B60R 2021/01054* (2013.01); *B60R 2021/01184* (2013.01); *B60R 2021/01286* (2013.01)

(58) Field of Classification Search
CPC .......... G06F 11/27; G06F 11/24; B60R 21/01; G08C 25/00
See application file for complete search history.

(56) References Cited

U.S. PATENT DOCUMENTS 5,793,822 A * 8/1998 Anderson .............. H04B 17/20
                                                        375/226
5,982,681 A * 11/1999 Schwarz ................. G06F 11/27
                                                        365/201
(Continued)

FOREIGN PATENT DOCUMENTS

DE        4108417 A1     9/1992

OTHER PUBLICATIONS

PSI5 Organization, p. 1-3 (Year: 2013).*
(Continued)

*Primary Examiner* — Marc Duncan
*Assistant Examiner* — Jonathan D Gibson
(74) *Attorney, Agent, or Firm* — Norton Rose Fulbright US LLP; Gerard Messina

(57) ABSTRACT

A checking device for a data preparation unit, including a preparation element for preparing sensor data for a data transmission; and a comparator for comparing the sensor data with the prepared sensor data; a fault of the data preparation unit being detected in the event that the prepared sensor data do not match the sensor data.

18 Claims, 1 Drawing Sheet

(51) Int. Cl.
  *G08C 25/00* (2006.01)
  *H04Q 9/00* (2006.01)
  *B60R 21/01* (2006.01)
  *G06F 11/24* (2006.01)

(56) References Cited

U.S. PATENT DOCUMENTS

| | | | | |
|---|---|---|---|---|
| 6,298,458 | B1* | 10/2001 | Cranford, Jr. | H04L 43/50 370/245 |
| 6,715,062 | B1* | 3/2004 | Moore | G06F 9/30003 712/227 |
| 7,653,854 | B2* | 1/2010 | Anzou | G11C 29/16 714/733 |
| 8,904,248 | B2* | 12/2014 | Park | G06F 11/221 714/716 |
| 2003/0035473 | A1* | 2/2003 | Takinosawa | H04L 1/24 375/224 |
| 2014/0019817 | A1* | 1/2014 | Park | G06F 11/221 714/712 |
| 2014/0358377 | A1* | 12/2014 | Hammerschmidt | G06F 11/36 701/45 |
| 2017/0248655 | A1* | 8/2017 | Guddeti | G01R 31/31703 |

OTHER PUBLICATIONS

International Search Report for PCT/EP2015/071429, dated Nov. 24, 2015.
"TMS320DM646x DMSoC Serial Peripheral Interface (SPI) User's Guide", 2011, XP055089722, Retrieved from Internet: URL:http://www.ti.com/lit/ug/spruer4b/spruer4b.
ARM: "PrimeCell UART (PL011)-Revision: r1p4-Technical Reference Manual", Internet Citation, 2000, XP007901821, URL:http://www.arm.com/pdfs/DDI0183F_uart_pl011_r1p4_trm.pdf.

* cited by examiner

CHECKING DEVICE FOR DATA PREPARATION UNIT

FIELD OF THE INVENTION

The present invention relates to checking device for a data preparation unit. The present invention also relates to a method for checking a data preparation unit.

BACKGROUND INFORMATION

Peripheral sensors in the automotive sector for highly safety-critical applications such as, for example, airbag and ESP systems normally transmit their data via the PSI5 protocol (Peripheral Sensor Interface 5) to an associated electronic control unit in the motor vehicle. A preparation unit is provided for preparing the sensor data.

It is disadvantageous that said preparation unit is not checked or is checked only insufficiently, as a result of which faults are possibly not detected and may result in unintended safety-critical events (e.g. activation of the airbag, steering interventions, etc.) in the motor vehicle.

SUMMARY OF THE INVENTION

An objective of the present invention is therefore to provide an improved check of a data preparation unit.

According to a first aspect, the objective is achieved by a checking device for a data preparation unit, including:
  a preparation element for preparing sensor data for a data transmission; and
  a comparator for comparing the sensor data to the prepared sensor data, a fault of the data preparation unit being detected in the event that the prepared sensor data do not match the sensor data.

According to a second aspect, the objective is achieved by a method for checking a data preparation unit, including the steps:
  preparing sensor data using a data preparation element,
  comparing the prepared data to the sensor data using a comparator, and, in the event that the prepared data do not match the sensor data,
  detecting a fault of the data preparation unit.

Specific developments of the checking device and of the method are the subject matter of the further descriptions herein.

One advantageous development of the checking device is characterized by the fact that the fault is signaled to a control unit. In this manner, the control unit is informed of a malfunction of the preparation unit, as a consequence of which it is possible to omit unintended safety-critical actions.

Another advantageous development of the checking device is characterized by the fact that a bitwise comparison of the sensor data with the prepared data may be performed by the comparator. This facilitates an efficient and thorough check of the functionality of the preparation unit.

Another advantageous development of the checking device is characterized by the fact that it is possible to detect a permanent or transient fault of the data preparation unit. This advantageously makes it possible to detect different kinds of faults of the data preparation unit.

Another advantageous development of the checking device is characterized by the fact that the checking device is situated in the sensor or in a control unit. This advantageously makes it possible to vary a technical implementation of the checking device.

Another advantageous development of the checking device is characterized by the fact that the data preparation unit prepares the data in accordance with the PSI5 protocol. This performs a check of a data preparation unit of a safety-critical protocol, in which faulty data could have serious consequences. In this manner, a safety level of the motor vehicle in operation is advantageously increased.

The present invention is described below in detail with additional features and advantages with reference to two figures. In this connection, all of the disclosed features form the subject matter of the present invention, regardless of their representation in the description and in the figures, and regardless of their antecedent reference in the claims. The figures are intended in particular for explaining the principles essential to the present invention.

DETAILED DESCRIPTION

The PSI5 protocol defines a digital current interface, which uses a two-wire line for data transmission of sensor data (e.g. in a motor vehicle). Data transmissions via point-to-point configurations as well as bus configurations with asynchronous and synchronous communication are supported. All information is transmitted via the currents. Because of the relatively high electrical signal current of 26 mA and a bit encoding in Manchester code, it is possible to achieve a high noise immunity, as a result of which it is sufficient to use the cost-effective twisted two-wire line for wiring.

In highly safety-critical applications in motor vehicles such as defined, for example, in the ISO 26262 standard having an ASIL-D level (automotive safety integrity level), faults may result in an unintended triggering of the airbag, in braking or steering interventions or in other critical actions. Previous known concepts either perform no or only little monitoring of the PSI5 preparation unit, for example using watchdog mechanisms in the case of an implementation of the PSI5 preparation unit as a microcontroller system.

The present invention provides a comparison process which compares the PSI5-prepared data to the original data provided by the sensor and which, in the event of a fault, detects and signals the fault.

Figure 1:
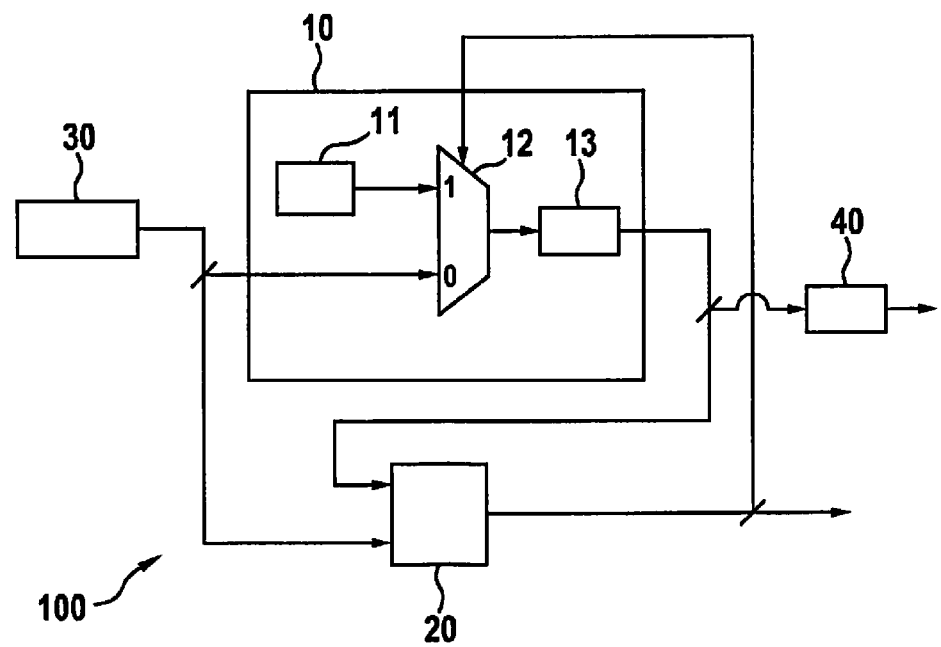
FIG. 1 shows a block diagram of a specific embodiment of the checking device according to the invention.

FIG. 1 shows a block diagram of one specific embodiment of a checking device 100 according to the invention with an exemplary scenario of an airbag sensor system of a motor vehicle. Original sensor data 30 (e.g. in the form of a data word) originating from a sensor (e.g. an airbag sensor) are supplied to a data preparation unit 10. The sensor data 30 are furthermore supplied to a multiplexer 12 of preparation unit 10. The original sensor data 30 are additionally also supplied to a comparator 20, comparator 20 also being supplied with an output signal of a preparation element 13 of data preparation unit 10.

Comparator 20 performs a bitwise comparison of the original sensor data 30 and the data prepared by preparation element 13, comparator 20 for this purpose first performing a corresponding back-encoding of the data.

In the event that comparator 20 does not detect a fault, the unadulterated sensor data 30 are supplied to multiplexer 12, upon which preparation element 13 prepares the sensor data 30 and transmits them as PSI5 data 40 to the control unit (not shown). The PSI5 data 40 are Manchester-encoded and are used by the control unit for appropriate actions.

In the event of a fault, which is signaled to multiplexer 12 by the output signal of comparator 20, fault codes of a fault encoder 11 are supplied to multiplexer 12. This is the case when the original sensor data 30 no longer match the data prepared by data preparation unit 10, as a result of which a proper functionality of data preparation unit 10 is no longer given.

In this case, comparator 20 detects a fault, as a consequence of which multiplexer 12 supplies a fault code of fault encoder 11 to preparation element 13. The case of the fault is furthermore signaled by comparator 20 to the control unit. Because of the signaling by comparator 20, the control unit is able to detect that the PSI5 data 40 prepared by data preparation element 13 are corrupt and point to a faulty functionality of data preparation unit 10. As a result, a corresponding action of the control unit is advantageously initiated or omitted.

For example, in the case of an acceleration value of an acceleration sensor situated in a bumper, which was incorrectly prepared by data preparation unit 10, it is possible to omit an activation of an airbag.

In this context, it is possible to detect both a systemic and a permanent fault of data preparation unit 10. Alternatively, it is also possible that the fault of data preparation unit 10 is of a transient nature, in which case comparator 20 ceases to signal the fault following the cessation of the fault case.

In the case of a detected fault, the control unit may attempt for example to remedy the fault by restarting or resetting the sensor.

The present invention may be used advantageously for any sensors in the automotive sector that are independently able to generate a fault remedy action. A technical implementation of the checking device of the present invention may occur for example in an additional electronic circuit or as an external separate microcontroller.

Figure 2:
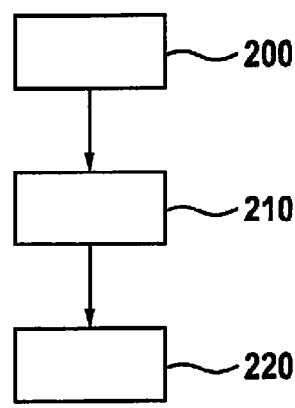
FIG. 2 shows a basic sequence of one specific embodiment of the method according to the invention.

FIG. 2 shows a basic flow chart of an embodiment of the method according to the present invention.

In a step 200, sensor data 30 are prepared by a data preparation element 13.

In a step 210, a comparator 20 compares the prepared data to sensor data 30, a fault of data preparation unit 10 being detected in the event that the prepared data do not match sensor data 30.

In summary, the present invention provides a check of a data preparation unit, in particular a data preparation unit for a PSI5 data transmission protocol. Due to the fact that in sensor systems in the automotive sector either only valid data or only faulty data may be transmitted to associated control units, an efficient detection of a case of a fault is possible in this manner. Advantageously, it is thus possible to initiate a quick replacement of a faulty sensor system.

Although the present invention was described above with reference to concrete exemplary embodiments, it is not limited to these. One skilled in the art will thus also implement specific embodiments that are not described, or only partially described, above, without deviating from the core of the present invention.

What is claimed is:

1. A checking device for a data preparation unit, comprising:
    a preparation element to prepare sensor data from a sensor for a data transmission; and
    a comparator to compare the sensor data to the prepared sensor data;
    wherein a fault of the data preparation unit is detected if the prepared sensor data do not match the sensor data,
    wherein the prepared data is bit encoded and transmitted via a high electrical signal current, so as to provide a high noise immunity, and
    wherein if the comparator detects a fault, a multiplexer supplies a fault code of a fault encoder to the preparation element, and the fault is furthermore signaled by the comparator to the control unit.

2. The checking device of claim 1, wherein the fault is signaled to a control unit.

3. The checking device of claim 1, wherein the comparator is configured to perform a bitwise comparison of the sensor data with the prepared data.

4. The checking device of claim 1, wherein a permanent or transient fault of the data preparation unit is detectable.

5. The checking device of claim 1, wherein the checking device is situated in the sensor or in a control unit.

6. The checking device of claim 1, wherein the data preparation unit prepares the data in accordance with the PSI5 protocol.

7. The checking device of claim 1, wherein the high electrical signal current is substantially 26 mA.

8. The checking device of claim 1, wherein the prepared data is Manchester encoded.

9. The checking device of claim 1, wherein because of the signaling by the comparator, the control unit is able to detect that the prepared data from the data preparation element are corrupt and point to a faulty functionality of the data preparation unit, and as a result, a corresponding action of the control unit is initiated or omitted.

10. A method for checking a data preparation unit, the method comprising:
    preparing sensor data with the aid of a data preparation element;
    comparing the prepared data to the sensor data from a sensor with the aid of a comparator; and
    detecting, if the prepared data do not match the sensor data, a fault of the data preparation unit;
    wherein the prepared data is bit encoded and transmitted via a high electrical signal current, so as to provide a high noise immunity, and
    wherein if the comparator detects a fault, a multiplexer supplies a fault code of a fault encoder to the preparation element, and the fault is furthermore signaled by the comparator to the control unit.

11. The method of claim 10, wherein the sensor data is prepared in accordance with the PSI5 protocol.

12. The method of claim 10, wherein a bitwise comparison of the sensor data and the prepared data is performed.

13. The method of claim 10, wherein the fault is signaled to a control unit.

14. The method of claim 10, wherein the high electrical signal current is substantially 26 mA.

15. The method of claim 10, wherein the prepared data is Manchester encoded.

16. A method for checking a data preparation unit, the method comprising:
    preparing sensor data with the aid of a data preparation element;
    comparing the prepared data to the sensor data from a sensor with the aid of a comparator; and
    detecting, if the prepared data do not match the sensor data, a fault of the data preparation unit;
    wherein the prepared data is bit encoded and transmitted via a high electrical signal current, so as to provide a high noise immunity, and wherein if the comparator does not detect a fault, the sensor data are supplied to a multiplexer, upon which the data preparation element prepares the sensor data and transmits the prepared data as PSI5 data 40 to the control unit.

17. The method of claim 10, wherein because of the signaling by the comparator, the control unit is able to detect that the prepared data from the data preparation element are corrupt and point to a faulty functionality of the data preparation unit, and as a result, a corresponding action of the control unit is initiated or omitted.

18. A checking device for a data preparation unit, comprising:
   a preparation element to prepare sensor data from a sensor for a data transmission; and
   a comparator to compare the sensor data to the prepared sensor data;
   wherein a fault of the data preparation unit is detected if the prepared sensor data do not match the sensor data,
   wherein the prepared data is bit encoded and transmitted via a high electrical signal current, so as to provide a high noise immunity, and
   wherein if the comparator does not detect a fault, the sensor data are supplied to a multiplexer, upon which the data preparation element prepares the sensor data and transmits the prepared data as PSI5 data 40 to the control unit.

* * * * *